United States Patent [19]

Barecki, deceased et al.

[11] 4,252,341
[45] Feb. 24, 1981

[54] CRASH PAD FOR VEHICLE SEATS

[75] Inventors: Chester J. Barecki, deceased, late of Grand Rapids, Mich.; by Thaddeus C. Barecki, executor, Shelby, Mich.

[73] Assignee: American Seating Company, Grand Rapids, Mich.

[21] Appl. No.: 22,650

[22] Filed: Mar. 21, 1979

[51] Int. Cl.³ .............................................. B60R 21/02
[52] U.S. Cl. .................................... 280/751; 297/488; 297/DIG. 2
[58] Field of Search ...................... 280/748, 751, 752; 296/63, 64; 297/445, 452, 455, 456, 457, 460, 487, 488, DIG. 2; D6/48

[56] References Cited

U.S. PATENT DOCUMENTS

| 2,624,596 | 1/1953 | Clingman | 280/751 |
|---|---|---|---|
| 2,859,048 | 11/1958 | Munn | 297/456 X |
| 2,931,426 | 4/1960 | Brueder | 297/452 |
| 2,946,374 | 7/1960 | Dickey | 280/748 |
| 3,172,684 | 3/1965 | Isaac | 280/748 |
| 3,188,142 | 6/1965 | Probst | 297/456 |
| 3,206,250 | 9/1965 | Komenda | 297/456 |
| 3,464,751 | 9/1969 | Barecki et al. | 297/452 X |
| 3,523,710 | 8/1970 | Barecki et al. | 297/456 |
| 3,537,751 | 11/1970 | Masahiko et al. | 297/452 |
| 3,544,164 | 12/1970 | Ohta | 297/452 |
| 3,695,689 | 10/1972 | Barecki | 297/457 X |
| 3,695,707 | 10/1972 | Barecki et al. | 297/460 |
| 3,774,713 | 11/1973 | Stegmaier | 280/751 X |
| 3,797,858 | 3/1974 | Yamada | 297/456 X |
| 3,817,553 | 6/1974 | Wilfert | 280/752 |
| 3,861,486 | 1/1975 | Wilfert | 280/752 X |
| 3,877,749 | 4/1975 | Sakurai et al. | 297/452 X |
| 3,989,275 | 11/1976 | Finch et al. | 280/751 |
| 4,032,175 | 6/1977 | Aibe et al. | 297/488 X |
| 4,106,810 | 8/1978 | Barecki | 280/751 X |
| 4,109,959 | 8/1978 | Barecki et al. | 297/445 X |

Primary Examiner—John J. Love
Assistant Examiner—Michael Mar
Attorney, Agent, or Firm—Price, Heneveld, Huizenga & Cooper

[57] ABSTRACT

A vandal proof and inexpensive crash pad for a transportation vehicle seat is provided that meets Department of Transportation Head Injury Criterion. The crash pad is designed for use on a vehicle seat having a rigid rail frame. A seat back formed of a sheet of flexible material having a high surface hardness is mounted on the rigid rail frame. The top portion of the seat back includes an integrally formed flexible energy absorbing bubble. The energy absorbing bubble extends substantially the length of the seat back and is disposed at the top of the seat back for cushioning the impact of a passenger's head during an impact or rapid maneuver. The energy absorbing bubble can encompass a flexible energy absorbing brace, having an L-shaped cross section, that is cantilevered from the rigid rail frame.

14 Claims, 7 Drawing Figures

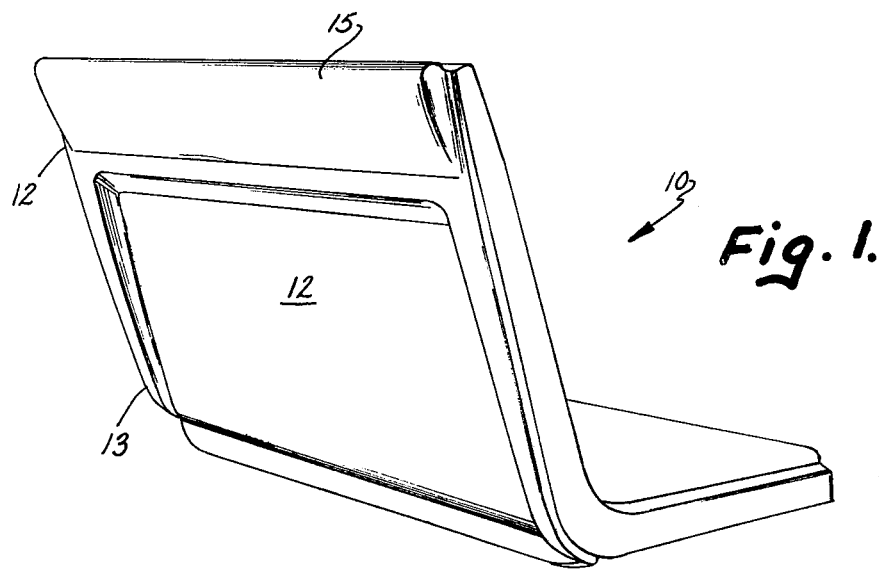
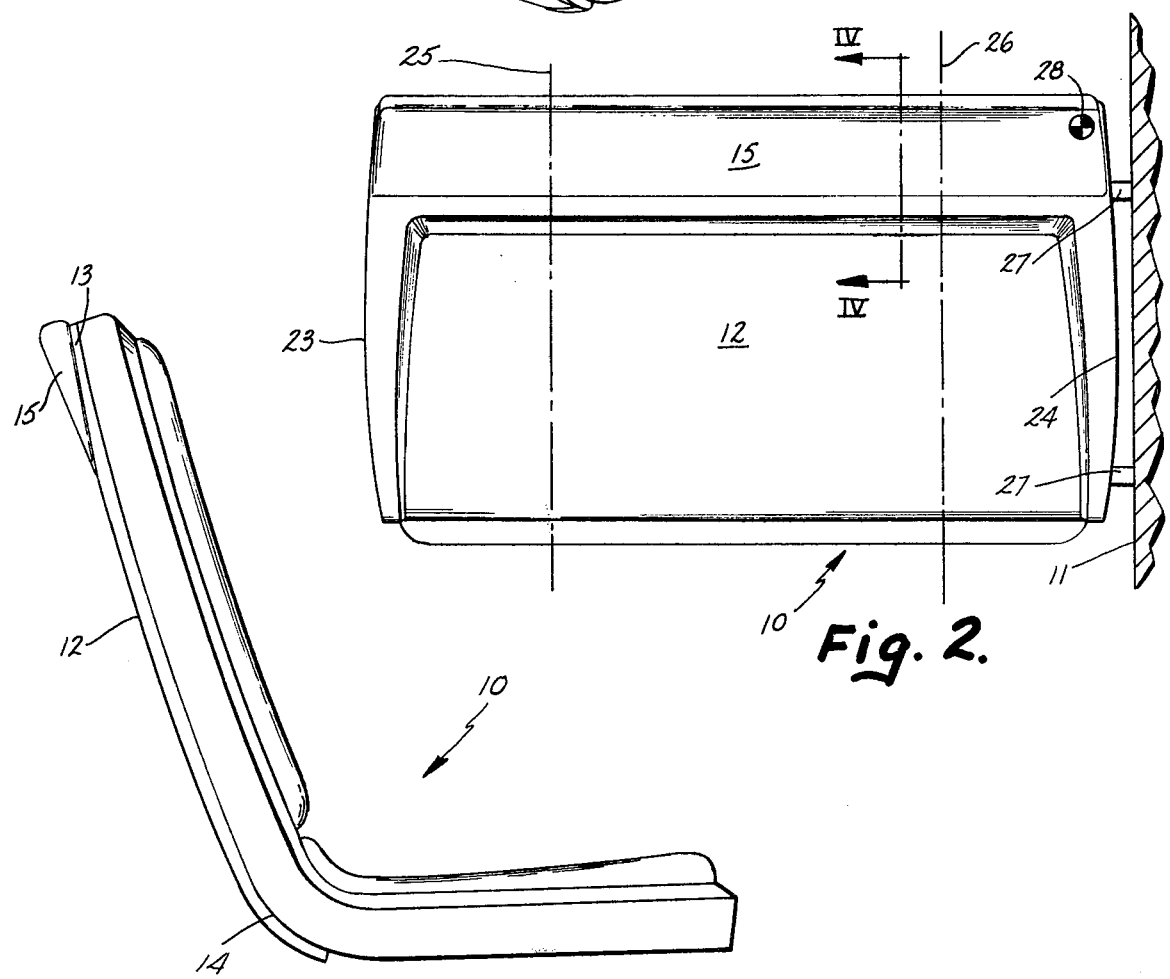

CRASH PAD FOR VEHICLE SEATS

BACKGROUND OF THE INVENTION

The present invention relates generally to crash pads for transportation vehicle seats and more specifically to a crash pad that meets the Department of Transportation Head Injury Criterion for vehicle seats.

In recent years, efforts have been made to improve the crash worthiness of mass transportation vehicles such as school buses, city and interstate buses, trains and aircraft. Crash studies particularly in the ground transportation industry have shown that one of the major causes of injury to passengers in an accident is the result of being impacted or thrown into the vehicle seat structures. In a conventional mass transportation vehicle such as a bus, passengers are thrown from their seats forwardly into the next adjacent seat.

In the mass transportation industry and in particular in buses, active restraint systems such as seat belts have not received ready acceptance, due primarily to the nature of the vehicles involved and their uses. Thus, the trend, particularly in buses, has been to provide for crash worthiness with passive restraint systems. Most recently, these efforts have been directed to arranging the interiors of the vehicles so that the passengers are compartmentalized in a fore and aft direction by pairs of vehicle seats. The design emphasis on the seats themselves is to provide a seat which is capable of absorbing impact energy in a controlled manner within certain levels so as to reduce or prevent the occurrence of, and severity of injuries to the passengers. In an accident, a passenger typically will be hurdled forward, first impacting the seat in front of him with his knees. Next, the head of the passenger will impact the upper portion of the rear surface of the seat back and this impact is followed by a full body impact against the back of the seat.

In an effort to provide crash protection and in accordance with the mandate set forth in the National Motor Vehicle Safety Act of 1966, 15 USC s/s 1381 et seq., as amended by Public Law 93-492 in 1974, the Department of Transportation issued design specifications which set forth certain criteria relating to energy absorbtion and compartmentalization characteristics which must be met by public mass transportation vehicle seating. With regard to the energy absorbing characteristics of the barrier or seat used to restrain the passengers, they must meet three basic requirements. First, the barrier must provide an energy absorbing structure that prevents the force applied to an occupant impacting the barrier from exceeding a limit that would cause internal injuries. The second and third requirements are impact zone criterion for the head and legs. According to these impact zone criterion, surfaces of the barrier contacted by the legs and head of the passenger during impact must meet separate energy absorbtion requirements that prevent the knees or head of the occupant from receiving a damaging spike of force.

The use of mere padding to meet Head Injury Criterion is unsuitable because of the bulk of the padding required to meet the criterion. Furthermore, padded seats are undesirable since they are often the object of vandalism. Not only is the vandalized seat unsightly, but once cut, the padding often loses its effectiveness and the seat no longer meets head injury criterion. In one prior art arrangement, a plastically deformable metal panel was secured to the seat back for yielding and absorbing large amounts of energy during the blow. However, when such a crash pad was provided, a problem was presented by the panel itself presenting exposed metal edges, exposed fasteners and the like. Thus, even where a deformable metal panel was provided, the panel was covered with a layer of cushioning material or padding which is easily vandalized.

SUMMARY OF THE INVENTION

These and other problems in the prior art are solved by provision of a seat back covering a rigid rail frame, the seat back being formed of a sheet of flexible material having a high surface hardness. The seat back may be formed from any one of a variety of different sheet materials, including steel and a number of polymeric materials. A flexible energy absorbing bubble is integrally formed in the top portion of the seat back to provide a crash pad that meets existing Department of Transportation Head Injury Criterion through elastic deformation. The bubble and the seat back may be inexpensively formed, such as by vacuum molding in the case where a thermoplastic material is used and while the bubble is flexible and resilient enough to meet the head injury criterian, its hard durable exterior surface is not susceptible to vandalism or wear.

In a more narrow aspect of the invention the bubble encompasses a flexible energy absorbing brace having a generally L-shaped cross section. The brace is cantilevered from the seat frame and it ensures that the resilient bubble does not bottom on the rigid rail frame during an impact.

BRIEF DESCRIPTION OF THE DRAWINGS

FIG. 1 is a rear perspective view of a vehicle seat incorporating the crash pad of the present invention.

FIG. 2 is a rear elevational view of a vehicle seat incorporating the crash pad of the present invention.

FIG. 3 is a side elevational view of a vehicle seat incorporating the crash pad of the present invention.

DESCRIPTION OF THE PREFERRED EMBODIMENTS

Figure 4:
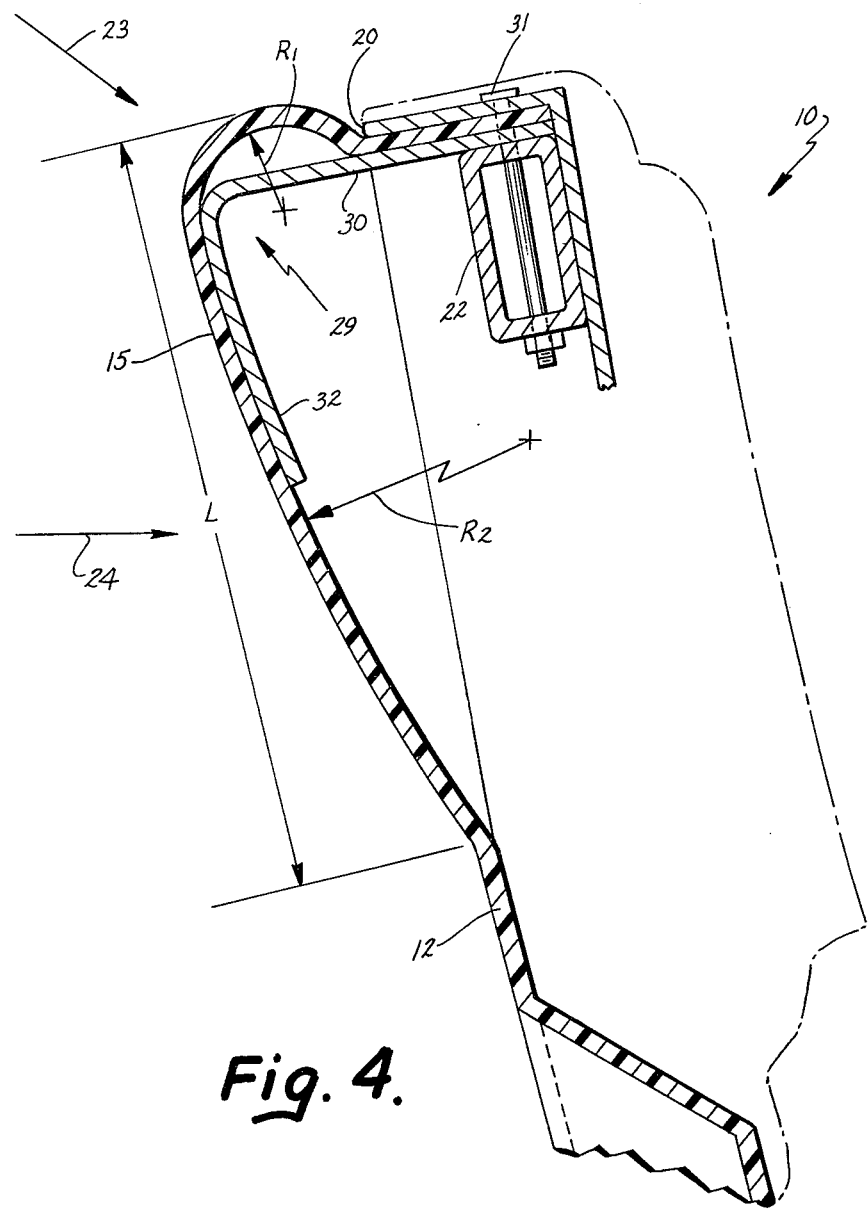
FIG. 4 is partial cross-sectional view of a crash pad constructed according to the present invention taken along lines IV—IV of FIG. 2.

Referring to FIGS. 1, 2 and 3 a vehicle seat 10 is illustrated. The main structural support of the vehicle seat 10 is a rigid rail frame, not illustrated herein. The seat 10 may be cantilevered from a sidewall 11 of the vehicle, as illustrated in FIG. 2, or may be mounted on a pedestal extending from the floor of the vehicle. Grab rails or the like, not illustrated herein, may also be provided. According to the invention, the seat 10 is provided with a back 12 rigidly secured to and covering the rigid rail frame. The seat back 12 comprising a seat back includes a top portion 13 and a bottom portion 14. The back 12 is made of a sheet of flexible material having a hard surface and a flexible energy absorbing bubble 15 is integrally formed therewith. The bubble 15 is integrally formed in the top portion 13 of the back 12 to substantially cover the head impact zone. As best illustrated in FIG. 2, the bubble 15 extends substantially the length of the seat back 12. As disclosed in the drawings, the bubble 15 is integrally formed with the seat back 12 and the borders of the bubble 15 are secured to the seat back 12.

Referring now to FIG. 4, it is illustrated that the cross section of the bubble 15 extends rearwardly and upwardly from the top edge 20 of the seat 10 along an arc initially having an approximately constant radius $R_1$. The cross section of the bubble 15 follows the approximately constant radius $R_1$ for an arc of approximately 180°. The remainder of the arc is provided with a generally increasing radius $R_2$ such that the cross section of the bubble 15 gradually blends into the seat back 12. As disclosed in the drawings the effect is a surface extending from its topmost portion to its bottom most portion upwardly, rearwardly and downwardly with respect to the seat back 12.

The rectangular tube illustrated in section at 22 represents a portion of the rigid rail frame comprising the principal structural support of the seat 10. The bubble 15 prevents contact between an occupant's head, approaching generally in the direction of arrows 23 or 24, and the frame member 22. The bubble 15 must be stiff enough to prevent bottoming out on the tube 22 during an impact and must be flexible and resilient enough to prevent breakage of the bubble during an impact. Preferably the tube 22 is provided with the relatively thin vertical cross section illustrated in FIG. 4 to make it less likely that the bubble 15 will bottom out on tube 22 during an impact.

When impacted along a range of angles varying approximately from the position of arrow 23 to the position of arrow 24, the bubble 15 must meet the Department of Transportation Head Injury Criterion. That is, when the bubble 15 is impacted at 22 feet per second by the specified head form, the axial acceleration at the center of gravity of the head form shall be such that the expression:

$$\left[ \frac{1}{t_2 - t_1} \int_{t_1}^{t_2} adt \right]^{2.5} (t_2 - t_1)$$

shall not exceed 400 where, a is the axial acceleration expressed as a multiple of g (the acceleration due to gravity) and $t_1$ and $t_2$ are any two points in time during the impact. The result of this expression is what is commonly referred to as a HIC number.

The head form for the measurement of acceleration is a rigid surface comprised of two hemispherical shapes with a total equivalent weight of 11.5 pounds. The first of the two hemispherical shapes has a diameter of 6.5 inches. The second of two hemispherical shapes has a two inch diameter and is centered to protrude from the outer surface of the first hemispherical shape. The surface roughness of the hemispherical shapes does not exceed 63 micro inches root mean square. The direction of travel of the head form is coincidental with the straight line connecting the center points of the two spherical outer surfaces which constitute the head form shape.

Referring back to FIG. 2 it is illustrated that the seat 10 includes an interior facing side 23 and an exterior facing side 24. The lines 25 and 26 represent the centers of adjacent interior and exterior seating positions normally provided for by the seat 10. In the case where the seat 10 is cantilevered from the wall 11 of the vehicle with a high post or attachment point at 27, the area of the seat back which is most difficult to make conform to the Head Injury Criterion is the area 28 adjacent the wall 11 of the vehicle. This area is most difficult to cushion since it is directly adjacent the fixed pin 27 and the seat frame is unable to deflect to any significant degree during an impact. In all other areas the bubble 15 illustrated in FIG. 4 adequately protects the head of the occupant. In the area 28 there is a tendency for the bubble 15 to bottom out on the tube 22 during an impact. Thus, in some cases, particularly in the area of a seat back adjacent a high post mounting arrangement the bubble 15 is provided with the L-shaped brace 29 illustrated in FIG. 4. The brace 29 comprises a generally horizontal flexible beam 30 cantilevered from the tube 22 of the seat frame. The beam 30 may be conveniently secured to the tube 22 with a plurality of bolts such as the one illustrated at 31 which pin both the beam 30 and the seat back 12 to the frame. The brace 29 further includes a flexible foot 32 extending generally orthogonal to the beam 30 and conforming to the shape of the bubble 15. The foot 32 is in sliding engagement with the interior of the bubble 15.

A suitable thermoplastic material for use in manufacturing the seat back and crash pad according to the present invention is manufactured by the General Electric Company and is identified by the trademark NORYL. NORYL is a thermoplastic phenylene oxide-based resin and when a sheet of NORYL having a thickness of approximately ⅛ of an inch is vacuum formed to the shape indicated in FIG. 4, with a radius $R_1$ of approximately 9/16 of an inch and a dimension L of approximately 5¼ inches, the bubble 15 will meet the aforementioned Department of Transportation Head Injury Criterion in all but the most extreme cases. The integral seat back and crash pad may also be injection molded, however, the cost of injection molding dies is prohibitive. Steel as well as a wide range of polymeric materials, including thermoplastics, fiberglass and other settable resins may be alternately employed to provide a flexible bubble with a durable exterior surface.

Figure 5:
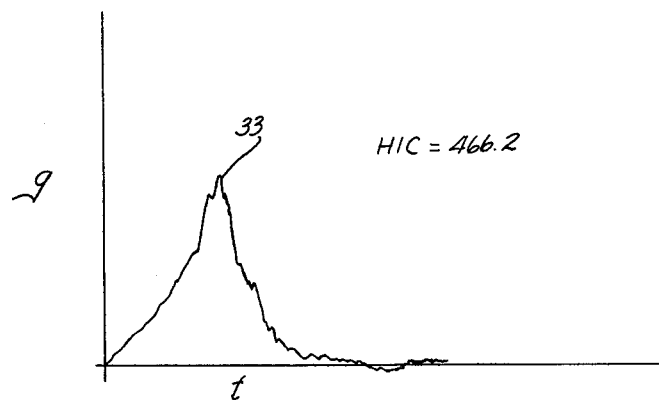
FIG. 5 is a plot of acceleration versus time for a headform impacting one embodiment of the crash pad of the present invention.
Figure 6:
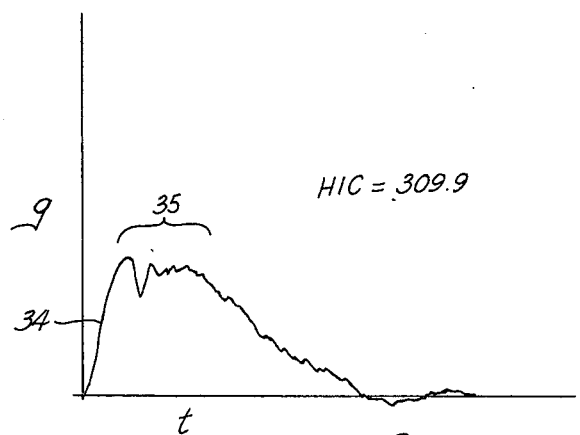
FIG. 6 is a plot of acceleration versus time for a headform impacting another embodiment of the crash pad of the present invention.

Referring now to FIG. 5 the response of the ⅛ inch NORYL bubble is illustrated in the most extreme case, an impact adjacent a high mounting post. The acceleration peak 33 is due to bottoming of the bubble against the rigid frame directly adjacent the fixed mounting post. FIG. 6 illustrates the response of a ⅛ inch NORYL bubble with a ⅛ inch NORYL brace to an impact adjacent a fixed mounting post. The effect of the brace is evident in the increased slope of the initial portion of the acceleration curve at 34 and the broad, less intense peak at 35. HIC values for the two response curves illustrated in FIGS. 5 and 6 are 466.2 and 309.9, respectively. The trade off between the two configurations is that although the empty bubble is less stiff initially it may bottom and create unacceptable HIC values. The bubble acting in concert with the brace is much more stiff during the initial stages of the impact, perhaps causing more discomfort to the occupant during minor impacts, but producing a low broad response curve yielding acceptable HIC values, making severe trauma to the occupant unlikely, during a serious impact on a relatively inflexible portion of the frame. Similar results are obtainable with other materials and it should be understood that the brace may extend the entire length of the bubble or only along those areas of the frame where bottoming is found to be a problem. In cases where the brace is manufactured from a thermoplastic material such as NORYL, the brace may be formed by draping a sheet of thermoplastic over a hot mandrel. In other cases, the brace may be a metal stamping.

Figure 7:
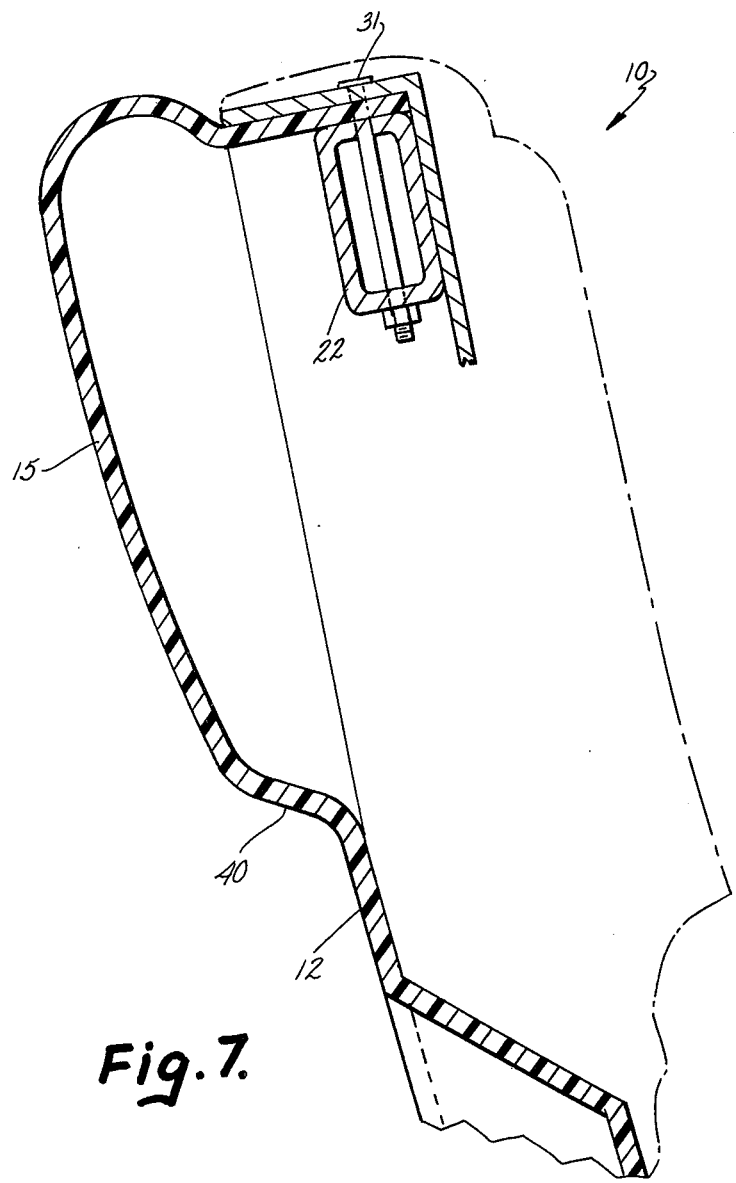
FIG. 7 is a partial cross-sectional view of another embodiment of the crash pad of the present invention.

FIG. 7 illustrates another embodiment of the integral seat back and crash pad of the present invention. In this case, a step 40 is provided at the bottom end of the bubble 15 rather than blending the bubble 15 into the seat back 12. This structure will increase the flexibility of the bubble 15 and may be used with or without the brace 29 illustrated in FIG. 4.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows:

1. In a vehicle seat comprising a top portion, a bottom portion, a forwardly facing occupant engaging seat, a rearwardly facing seat back including a seat back panel, said seat back having a rearwardly facing head impact zone disposed on said top portion of said seat which the head of an occupant seated directly behind the seat would normally engage during sudden deceleration, a rigid rail frame for supporting said occupant engaging seat and said seat back panel, said rail frame having a rigid stretcher member extending horizontally across said top portion of the seat, said seat back panel being secured to said stretcher and comprising a single piece extending a substantial distance between the sides of the seat and a substantial distance down the rear of the seat from the rigid stretcher member, said seat back panel forming the rear exterior of the seat and covering a substantial portion of the back portion of said rigid rail frame, said seat back panel being formed of a single sheet of material, having a surface sufficiently hard and durable to withstand cutting damage normally experienced by vandalism but said panel being sufficiently flexible and resilient to absorb energy and reduce damage to parts of a passenger's body striking the same, and a flexible energy absorbing bubble integrally formed in situ in the top portion of said seat back panel, said bubble comprising a flexible energy absorbing form defining a substantially hollow cavity having a top portion and a bottom portion, said top portion of said form having a first connection to said seat back panel, said energy absorbing form extending from said seat back panel connection in a direction at least rearwardly and then downwardly with respect to said first connection along an arc so as to provide a hollow form located between said stretcher member and an occupant sitting behind said seat, said bottom portion of said form extending downwardly and having a second connection to the remainder of said seat back panel to provide a crash pad in said head impact zone for preventing the head of an occupant seated directly behind the seat from coming into contact with said stretcher member and for absorbing the impact energy of the head of the occupant.

2. The vehicle seat of claim 1 wherein said seat back panel is formed from a metal stamping.

3. The vehicle seat of claim 1 wherein said seat back panel is vacuum molded.

4. The vehicle seat of claim 3 wherein said seat back panel is vacuum molded from a sheet of thermoplastic phenylene oxide-based resin having a thickness of approximately ⅛ inch or greater.

5. The vehicle seat of claim 1 wherein said top portion of said energy absorbing form is provided with a cross-section extending upwardly, rearwardly, and then downwardly from said first connection to said seat back panel along an arc of approximately 180 degrees.

6. The vehicle seat of claim 5 wherein said lower portion of said form is provided with a generally increasing radius blending said bottom portion of said form into said seat back panel to form said second connection.

7. The vehicle seat of claim 5 wherein said lower portion of said form is provided with a generally increasing radius tending to blend said bottom portion of said form into said seat back panel, the cross section of said form further including a step disposed at the bottom of said form interconnecting said lower portion of said form and said seat back to form said second connection.

8. The vehicle seat of claim 1 wherein said bubble encompasses a flexible energy absorbing brace having a generally L-shaped cross section.

9. The vehicle seat of claim 8 wherein said brace comprises a generally horizontal flexible beam cantilevered from said rigid rail frame and a flexible foot extending generally orthogonal to said beam, said foot being in sliding engagement with said bubble.

10. The vehicle seat of claim 8 wherein said flexible energy absorbing brace extends substantially the length of said seat back panel.

11. The vehicle seat of claim 8 wherein said vehicle seat includes an interior and an exterior side, and said flexible energy absorbing brace extends along a portion of said seat back panel adjacent said exterior side of said seat.

12. The vehicle seat of claim 8 wherein said brace is formed from a metal stamping.

13. The vehicle seat of claim 8 wherein said brace is formed by draping a sheet of thermoplastic material over a hot mandrel.

14. The vehicle seat of claim 13 wherein said seat back panel is formed from a sheet of thermoplastic phenylene oxide-based resin having a thickness of approximately ⅛ inch or greater.

* * * * *